April 5, 1932.  F. PETROVIC  1,852,855

CANDY ORNAMENTING MACHINE

Filed Feb. 13, 1931  2 Sheets-Sheet 1

Inventor
Frank Petrovic
By Williams, Bradbury,
McCaleb & Hinkle.
Attys.

April 5, 1932.  F. PETROVIC  1,852,855
CANDY ORNAMENTING MACHINE
Filed Feb. 13, 1931  2 Sheets-Sheet 2

Inventor
Frank Petrovic
By Williams, Bradbury,
McCaleb & Hinkle.
Attys.

Patented Apr. 5, 1932

1,852,855

UNITED STATES PATENT OFFICE

FRANK PETROVIC, OF CHICAGO, ILLINOIS, ASSIGNOR TO E. J. BRACH & SONS, OF CHICAGO, ILLINOIS, A CORPORATION OF ILLINOIS

CANDY ORNAMENTING MACHINE

Application filed February 13, 1931. Serial No. 515,544.

This invention relates to candy ornamenting machines, and particularly to machines which are suitable for stringing flowers or blossoms and other ornamentation upon candies.

One of the objects of the invention is to provide an improved candy ornamenting machine.

A further object of the invention is to provide a candy ornamenting machine in which a supply of liquid or pasty material may be maintained under pressure and extruded through one or more control discharge nozzles connected thereto for relative movement.

A further object of the invention is to provide a candy ornamenting machine comprising improved means for applying a suitable degree of pressure upon liquid or pasty material which is to be extruded upon candies.

A further object of the invention is to provide a candy ornamenting machine adapted to removably receive cylinders of liquid or paste and adapted to maintain said liquid or paste under pressure.

Other objects, advantages and capabilities of the invention will readily appear from the following description of a preferred embodiment, taken in conjunction with the accompanying drawings in which Figure 1 is a side elevation of a machine embodying the invention.

Figure 1:
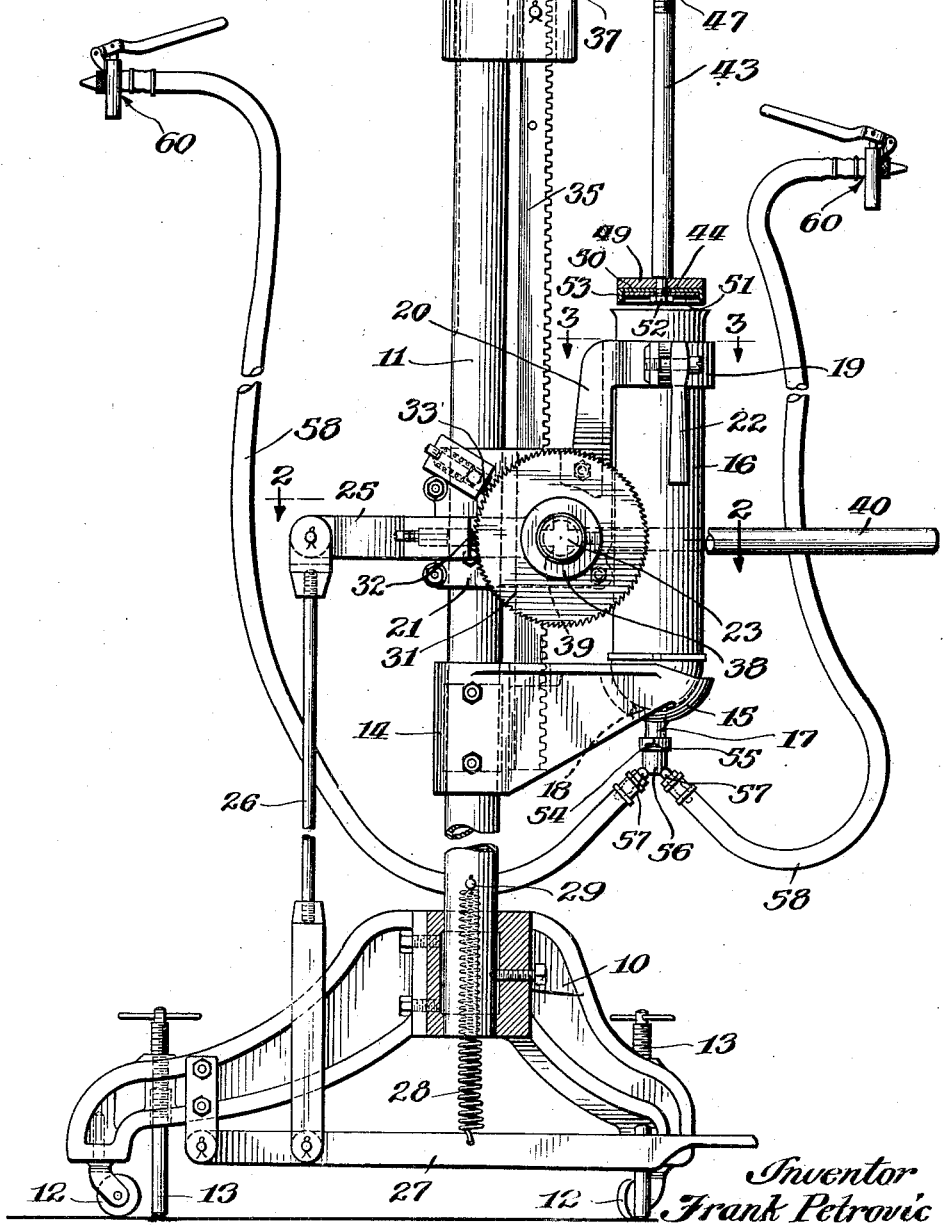
Figure 2:
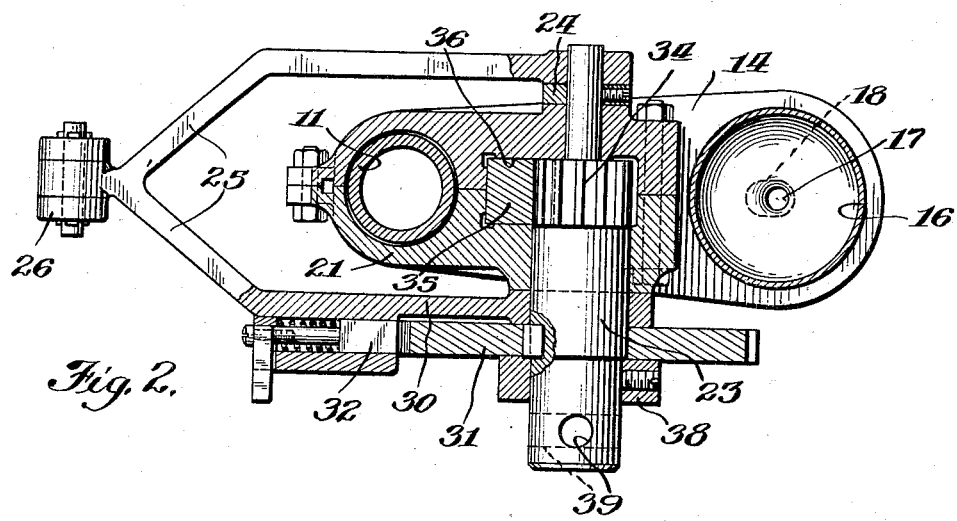
Fig. 2 is a sectional view thereof taken on the line 2—2 of Fig. 1.
Figure 3:
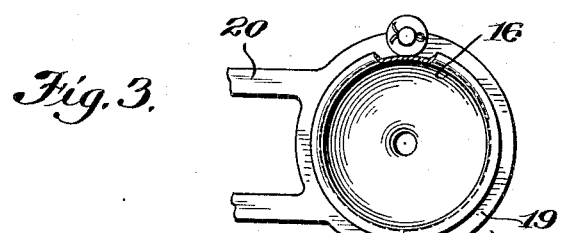
Fig. 3 is a sectional detail taken on the line 3—3 of Fig. 1.
Figure 4:
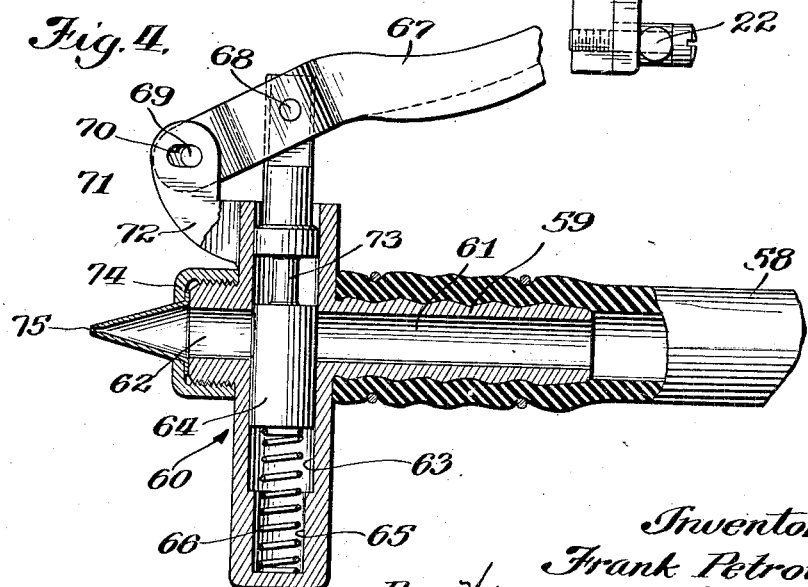
Fig. 4 is a sectional view of the discharge nozzle and valve.

Referring to the drawings, the reference numeral 10 designates a base, suitably of tripod construction upon which is mounted the vertical tubular column 11. The legs of the base 10 may suitably be provided with casters 12 and with screw studs 13 whereby the machine may be elevated, with the casters off the floor.

A bracket 14 is rigidly mounted upon the column, said bracket being dished as shown at 15 to receive the base of a cylinder 16. The discharge nipple 17 of the cylinder projects through an opening 18 in the dished portion 15 of the bracket 14. The cylinder 16 is maintained in substantially vertical position by means of a split clamping ring 19 which encircles it near its upper open end. The stationary portion of the clamping ring 19 is preferably integral with an upward extension 20 of a bracket 21 also rigidly mounted on the column 11. The movable portion of the ring 19 is pivoted to the stationary portion and is adapted to be secured thereto by a latch 22, pivotally mounted on the stationary portion and adapted to pass through a slot in the free end of the movable portion.

The bracket 21 provides a bearing for a horizontal shaft 23 which is held in position by a collar 24 rigidly mounted on its reduced end. The shaft 23 serves as a pivot for the yoke or bifurcated lever 25, the outer end of which is pivotally connected to a link 26. The link 26 is pivotally connected to a pedal lever 27 which is pivoted to the base 10 and is normally pulled upwardly by the spring 28 which is secured to it and to a stationary point of the machine. The upper end of the spring 28 may, for example, extend into the tubular column 11 and be secured to a pin 29 extending therethrough.

Upon the shaft 23 on the outer side of the leg 30 of the lever 25, is rigidly mounted a ratchet wheel 31 which cooperates with pawls 32 and 33, mounted respectively upon the leg 30 of the lever 25, and the bracket 21. When the pedal lever 27 is depressed the pawl 32 moves the ratchet wheel in counter-clockwise direction as viewed in Fig. 1, and the pawl 33 slips over the ratchet teeth and prevents rotation in the opposite direction when the foot pressure is released. Upon such release the spring 28 raises the pedal lever 27, the pawl 32 slipping over the ratchet teeth to resume its initial position.

The shaft 23 has rigidly mounted thereon a pinion 34 which is accommodated in a recess in the bracket 21. This pinion is adapted to cooperate with a vertical rack-bar 35 which is guided in an opening 36 in the bracket 21. This rack-bar extends vertically adjacent the column 11 and its upper end enters and is secured to the head 37.

On the outer side of the ratchet wheel 31, the shaft 23 has rigidly mounted thereon a collar 38. The end of the shaft 23 which projects beyond the collar 38 is provided with diametrical bores providing openings 39 adapted to receive a capstan bar 40 whereby the head 37 may be elevated when necessary, the pawls 32 and 33 being held out of engagement with the ratchet wheel 31 during such elevation.

The head 37 is provided with a bore which has a sliding fit upon the column 11, the head and column being splined to prevent relative rotation. The head overhangs the cylinder 16 and is provided with a vertical bore 41 in alignment with the axis of the cylinder. This bore freely receives the upper reduced end 42 of the rod 43 of a piston 44 which is adapted to enter the cylinder and expel the contents thereof through the discharge nipple 17. An annular boss 45 is formed on the underside of the head 37 around the bore 41 for the purpose of positioning a compression spring 46, the lower end of which abuts upon a collar 47 threadedly mounted upon the piston rod 43. The uppermost end of the reduced portion 42 of the piston rod is threaded to receive a nut 48, which maintains the piston and head in assembled relation.

The lower end of the piston rod 43 is shouldered to receive a disk 49 which serves as a backing for a washer 50 of leather or other suitable material. The leather washer is held in place against the disk 49 by means of a metal washer 51 which is held by a screw 52 which is threaded into a tapped opening in the lower end of the piston rod. The marginal portion of the flexible washer 50 is bent downwardly to form a skirt 53 which engages the inner wall of the cylinder 16 in the usual liquid tight manner, the skirt being pressed against the wall by the fluid pressure produced by the piston.

A pin 54 extends through the nipple 17 of the cylinder 16 so as to project on either side thereof. The projecting ends of this pin are adapted to enter bayonet slots 55 of a coupling head 56 to hold same in liquid tight relation to the nipple. The coupling head 56 is provided with one or more nipples 57, two such nipples being shown by way of example, to which flexible hoses 58 are adapted to be attached. The other end of each hose 58 is secured to the nipple 59 of a valve 60 which may suitably be of the slide valve type. The valve 60 may suitably comprise a body having a duct 61 through which the liquid may flow from the nipple 59 to the outlet 62. The valve body is provided with a bore 63 which intersects the duct 61 and is adapted to receive a piston 64. The bore 63 is provided with an extension 65 of reduced diameter which receives a spring 66 normally tending to expel the piston 64. The outer end of the piston extends into a slot in a handle 67 and is pivotally connected thereto by a pin 68. The handle 67 carries at one end a pin 69 which is received integral within slots 70 in lugs 71 which are carried by a bracket 72 which may be the valve body. It will readily be understood that the piston 64 may be pressed inwardly by the handle 67 and returned by the spring 66. The piston 64 is cut away at an intermediate point, as shown at 73, to provide passageway for fluid through the duct 61 when the piston is moved inwardly. The outward movement of the piston 66 is limited by the engagement of the pin 69 with the inner ends of the slots 70.

The outlet 62 of the valve 60 is externally threaded to receive a discharge nozzle 74 which has a discharge opening 75 of suitable configuration.

In operation, the head 37 is elevated in the manner above described, that is, the pawls 32 and 33 are withdrawn and the horizontal shaft 23 is rotated by means of the capstan-bar 40 so that the rack-bar 35 is driven upwardly. The cylinder 16, containing chocolate or other confectionery paste which is to be applied to the candies is placed with its base upon the dish portion 15 of the bracket 14 so that the discharge nipple 17 projects through the opening 18, the split clamping ring 19 being open to permit the cylinder to move into vertical position. The clamping ring 19 is now closed and the coupling head 56 is applied to the nipple 17. The machine is now ready for use.

During use the pedal lever 27 is actuated by the operator's foot whenever necessary. This actuation progressively rotates the ratchet wheel 31 in counter-clockwise direction, as seen in Fig. 1, and the rack-bar 35 is moved downwardly by the pinion 34, causing the piston 44 to enter the cylinder 16 and engage the paste therein. The upper end of the cylinder 16 is flared slightly, and the mounting of the piston 44 is sufficiently free to insure effective cooperation between the piston and cylinder. After the piston contacts with the paste the head 37 moves downwardly while the piston 44 is arrested. This relative movement results in the compression of the spring 46.

The valves 60 are now manually controlled by the operators to produce blossom-like or other desired designs in paste upon the surface of the candies, during which time the paste is extruded through the nozzle openings 75 by the action of the compression spring 46 upon the piston 44 which progressively moves downwardly. When the pressure diminishes or the spring 46 has expanded the maximum extent, the pressure is renewed by further actuation of the pedal lever 27.

Although the invention has been disclosed in connection with the specific details of a preferred embodiment thereof, it must be understood that such details are not intended to be limitative of the invention except insofar as set forth in the accompanying claims.

I claim:

1. A blossom stringing machine comprising a cylinder adapted to contain paste, a piston adapted to apply pressure thereto, a piston rod carrying said piston, a nozzle adapted to discharge paste therethrough, a spring adapted to apply pressure to the piston rod, and means for energizing said spring progressively as the paste is extruded.

2. A blossom stringing machine comprising a cylinder adapted to contain paste, a piston adapted to cooperate therewith, a piston rod carrying said piston, a nozzle including a manually operable valve adapted to discharge paste therethrough, a spring adapted to apply pressure on the piston rod, and means for energizing said spring while the paste is being extruded.

3. A blossom stringing machine comprising a frame, means for removably supporting a cylinder thereon, a coupling and hose removably mounted on the cylinder, a piston adapted to exert pressure on the contents of the cylinder, a movable head slidably mounted on said frame and adapted to support the piston, and resilient means between the head and piston adapted to exert a resilient pressure upon said contents.

4. A blossom stringing machine comprising a frame, means for removably supporting a cylinder thereon, a coupling and hose removably mounted on the cylinder, a piston adapted to exert pressure on the contents of the cylinder, a movable head slidably mounted on the frame and adapted to support the piston, resilient means between the head and piston adapted to exert a resilient pressure upon said contents, and pedal operated means adapted to move the piston into the cylinder.

5. A blossom stringing machine comprising a frame, a head slidably mounted thereon, a pedal, a rack and pinion drive between said pedal and head, ratchet means providing progressive movement of the head by pedal operation, and a piston having an articulated resilient mounting on the head for applying pressure to confectionery paste.

6. In a blossom stringing machine, a mobile supporting means, an upright carried thereby, a cylinder supported on said upright and readily removable therefrom, a plunger reciprocable in and removable from said cylinder, a cross-head having a vertical bore whereby it is slidably mounted on said upright, said cross-head being operatively connected to said plunger, and means to actuate said cross-head to move said plunger in said cylinder.

7. In a blossom stringing machine, a mobile supporting means, an upright carried thereby, a cylinder, a plunger reciprocable in and removable from said cylinder, a cross-head having a vertical bore whereby it is slidably mounted on said upright, said cross-head being operatively connected to said plunger, means to actuate said cross-head to move said plunger in said cylinder, said means comprising a rack carried by said cross-head, a pinion meshing therewith, and means to actuate said pinion.

8. In a blossom stringing machine, a mobile supporting means, an upright carried thereby, a cylinder, a plunger reciprocable in and removable from said cylinder, a cross-head having a vertical bore whereby it is slidably mounted on said upright, said cross-head being operatively connected to said plunger, means to actuate said cross-head to move said plunger in said cylinder, said means comprising a rack carried by said cross-head, a pinion meshing therewith, means to actuate said pinion, said last named means comprising a ratchet, a pawl engageable therewith, and an arm carrying said pawl oscillatable about the center of rotation of said pinion.

9. In a blossom stringing machine, a supporting means including an upright column, a cylinder, means carried by said column for supporting said cylinder in vertical position, a plunger co-actable with said cylinder, a cross-head vertically slidable upon said column above said supporting means, said plunger being operatively attached to said cross-head, means for actuating said cross-head and thereby said plunger, said last named means including an actuating pedal, and rack and pinion mechanism actuatable thereby.

In witness whereof, I hereunto subscribe my name this 9th day of February, 1931.

FRANK PETROVIC.